(12) United States Patent
Lee (10) Patent No.: US 7,653,626 B2
(45) Date of Patent: Jan. 26, 2010

(54) METHOD FOR DETECTING REGULARLY APPEARING PATTERNS

(75) Inventor: Chieh-Ho Lee, Hsinchu Hsien (TW)

(73) Assignee: Mediatek Inc., Hsin-Chu (TW)

( * ) Notice: Subject to any disclaimer, the term of this patent is extended or adjusted under 35 U.S.C. 154(b) by 285 days.

(21) Appl. No.: 11/556,283

(22) Filed: Nov. 3, 2006

(65) Prior Publication Data

US 2008/0109430 A1    May 8, 2008

(51) Int. Cl.
*G06F 7/00* (2006.01)
(52) U.S. Cl. .......................................... 707/6; 707/102
(58) Field of Classification Search ...................... 707/6
See application file for complete search history.

(56) References Cited

U.S. PATENT DOCUMENTS 4,673,987 A * 6/1987 Toyokawa .................. 382/244
4,780,713 A * 10/1988 Lundstrom ................. 345/536
2003/0220771 A1 * 11/2003 Vaidyanathan et al. ......... 703/2
2004/0083227 A1 * 4/2004 Yocom ....................... 707/101
2008/0075057 A1 * 3/2008 Liou et al. ................... 370/342

* cited by examiner

*Primary Examiner*—Pierre M Vital
*Assistant Examiner*—Sabana Rahman
(74) *Attorney, Agent, or Firm*—Thomas, Kayden, Horstemeyer & Risley (57) ABSTRACT

Methods for detecting regularly appearing pattern without excessive memory. The method comprises providing a matrix, and each row of the matrix comprises a location index and a count value. The count value is associated with the location index for indicating the number of the predetermined value that appears at certain locations. After a symbol is received, a current location index representing a current location is translated. A comparing row is picked from the matrix. The matrix is arranged in a circular manner such that the first row is a preliminary comparing row. The count value of the first row is incremented when the current location index equals the location index of the comparing row and the received symbol equals the predetermined value. The received symbol is determined as a regularly appearing pattern according to the count values in the matrix.

34 Claims, 9 Drawing Sheets

| $t_1$ | $C_1$ |
|---|---|
| $t_2$ | $C_2$ |
| $t_3$ | $C_3$ |
| $t_4$ | $C_4$ |
| $t_5$ | $C_5$ |
| ⋮ | ⋮ |
| $t_N$ | $C_N$ | first pointer → $t_2$ second pointer → ⋮

FIG. 7

METHOD FOR DETECTING REGULARLY APPEARING PATTERNS

BACKGROUND OF THE INVENTION

FIELD OF THE INVENTION

The invention relates to packet segmentation, and in particular relates to detecting a target symbol in a stream of symbols.

Figure 1:
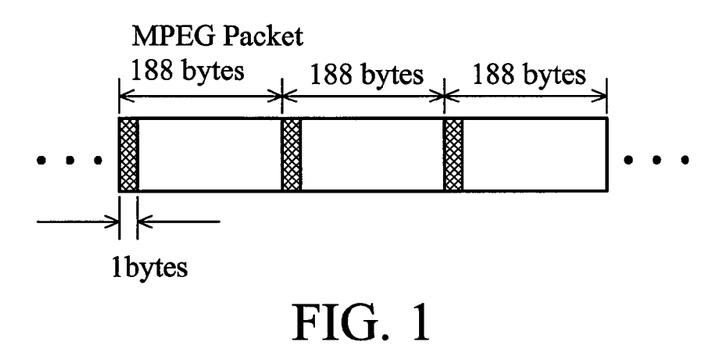
FIG. 1 shows an example of a structure of MPEG stream.
Figure 2:
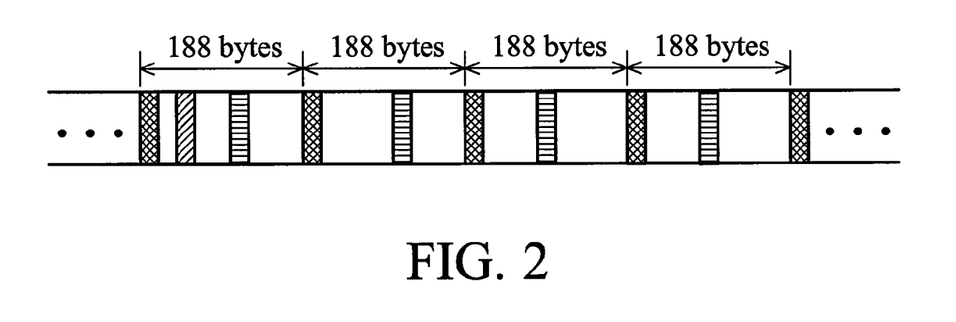
FIG. 2 shows an example of MPEG stream.

When processing MPEG stream data, packet segmentation is an important issue. FIG. 1 shows an example of the structure of an MPEG stream. The MPEG stream consists of a plurality of MPEG packets. An MPEG packet has 188 bytes, with one byte for synchronization purposes, three bytes of header containing service identification, scrambling and control information, followed by 184 bytes of MPEG or auxiliary data. The first byte of a packet is specified to be a sync byte having a constant value of $47_{hex}$. To delineate an MPEG packet from an MPEG stream, the sync byte is usually utilized as an indication. FIG. 2 shows an example of an MPEG stream. The darkened area represents the sync bytes of MPEG packets. The shaded area represents bytes that have the same value as the sync byte. Sync bytes appear regularly, but the others appear randomly. Thus, a delineating module uses the difference to delineate a packet from a stream.

Typically, to delineate a packet from a stream requires a memory array. Each time a byte with $47_{hex}$ appears, the memory array is updated to record when and how often the target byte appears. For example, a memory array having 188 cells is provided. A stream with $47_{hex}$ appears at locations 3, 50, 191, 200, and 379. The memory array notes a "1" at a cell representing location 3, then, notes a "1" at location 50. At location 191, which is 188 plus 3, the memory array updates the cell representing location 3. At location 200, the memory array changes its record at a cell representing location 12. At location 379, which is two locations 188 plus 3, the memory array updates the cell representing location 3 again. So far, a delineator can predict that the next sync byte will appear at location 567. In other words, the sync bytes appear at location q*188+3, where q is an integer number. $47_{hex}$ shows up at other locations is probably non-sync byte. The complexity of the method is low, but it requires memory as long as a packet length.

BRIEF SUMMARY OF THE INVENTION

A detailed description is of the invention given in the following embodiments with reference to the accompanying drawings.

Accordingly, a method for detecting a regularly appearing pattern without excessive memory is required. The method of the invention comprises providing a matrix comprising at least one row, wherein each row comprises a location index and a count value. The count value is associated with the location index for indicating the number of the predetermined value that appears at a time corresponding to the location index. After a symbol is received, a current location index representing a current location is translated, where the current location index ranges from 0 to N−1. The received symbol is compared with a predetermined value. The current location is compared with the location index of the first row in the matrix. The matrix is arranged in a circular manner such that the location index of the first row is closest to the current location value. The count value of the first row is incremented when the current location value equals the location index of the first row and the received symbol equals the predetermined value. Finally, whether the received symbol is in the regularly appearing pattern is determined according to the count values in the matrix.

In another embodiment of a method for detecting a regularly appearing pattern in a stream of symbols is that the pattern is a predetermined value, and the period of the regularly appearing patterns is N symbols. The method comprises providing a memory comprising a plurality of memory cells, wherein each memory cell has two fields, one field indicating a location index, and the other indicating a count value, and providing a first pointer and a second pointer associated with the memory. A symbol is received. A current location index representing a current location value is updated, wherein the current location index ranges from 0 to N−1. The location index pointed to by the second pointer is set to be the as same as the location index pointed to by the first pointer when the location index pointed to by the first pointer is equal to the current location. The count value indicated to by the second pointer is set as same as the count value pointed to by the first pointer when the location index pointed to by the first pointer equals to the current location. The received symbol is compared with the predetermined value. The current location index is compared with the location index pointed to by the first pointer. The positions of the first and second pointers are arranged. The count value pointed to by the first pointer is incremented when the current location value equals the location index pointed to by the first pointed and the received symbol equals the predetermined value. Whether the received symbol is in the regularly appearing pattern is determined according to the count values of the memory.

BRIEF DESCRIPTION OF THE DRAWINGS

The present invention can be more fully understood by reading the subsequent detailed description and examples with references made to the accompanying drawings, wherein:

FIG. 3*a* shows another flowchart of detecting regularly appearing patterns according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3A:
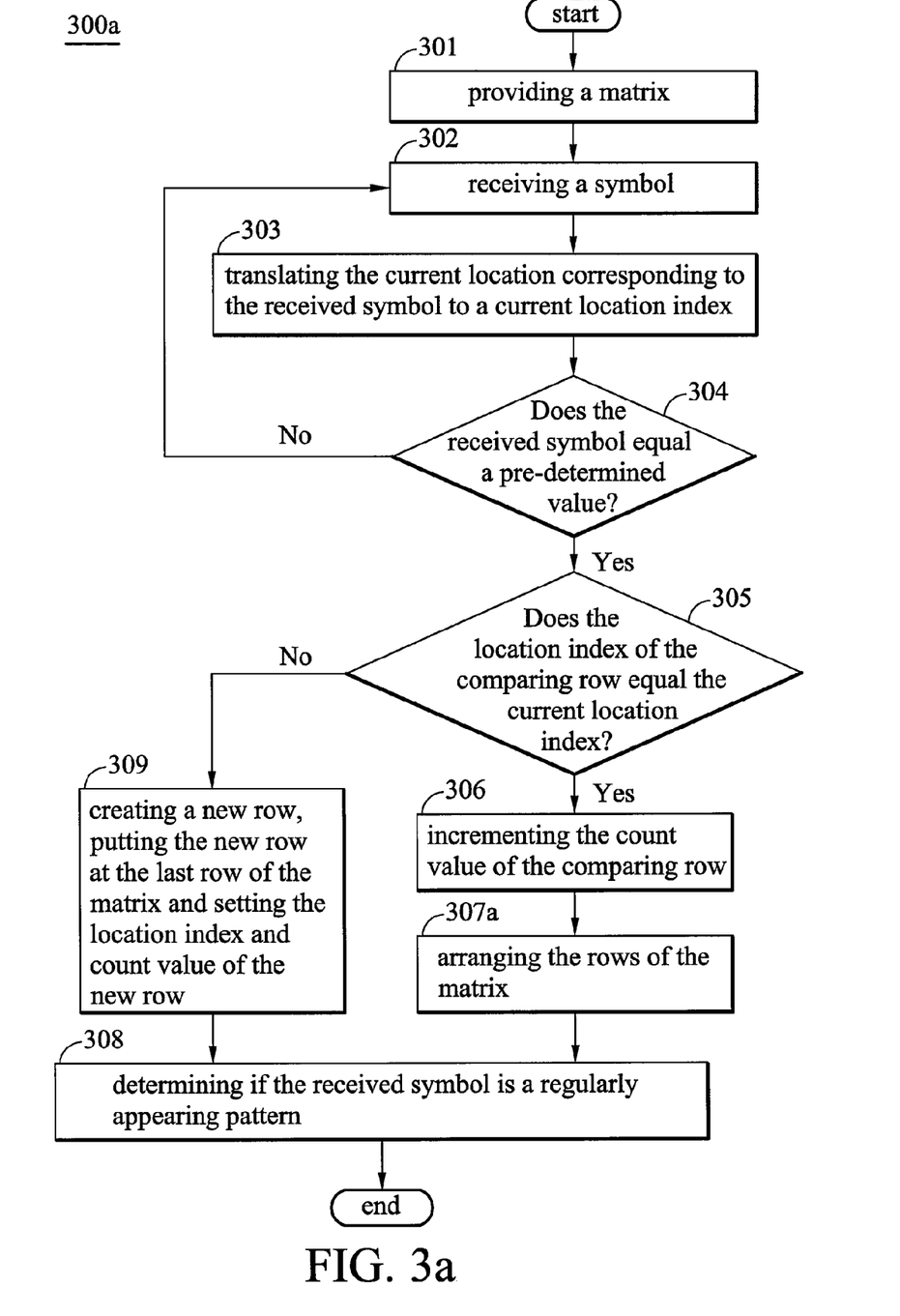
FIG. 3*a* shows a flowchart of detecting regularly appearing patterns.

FIG. 3 shows a flowchart of a method for detecting regularly appearing patterns by comparing a symbol based on a specific order in a stream of symbols. In the invention, the regularly appearing patterns are the sync bytes of MPEG packets. The sync byte, located at the first byte of an MPEG packet, has a constant value of $47_{hex}$. The period N of the regularly appearing pattern is the packet length, 188 bytes. The invention, however, is not limited to processing MPEG stream data. Rather, it will be apparent to persons skilled in the art(s) from the teachings provided herein that other functional flows are within the scope and spirit of the present invention.

Figure 4A:
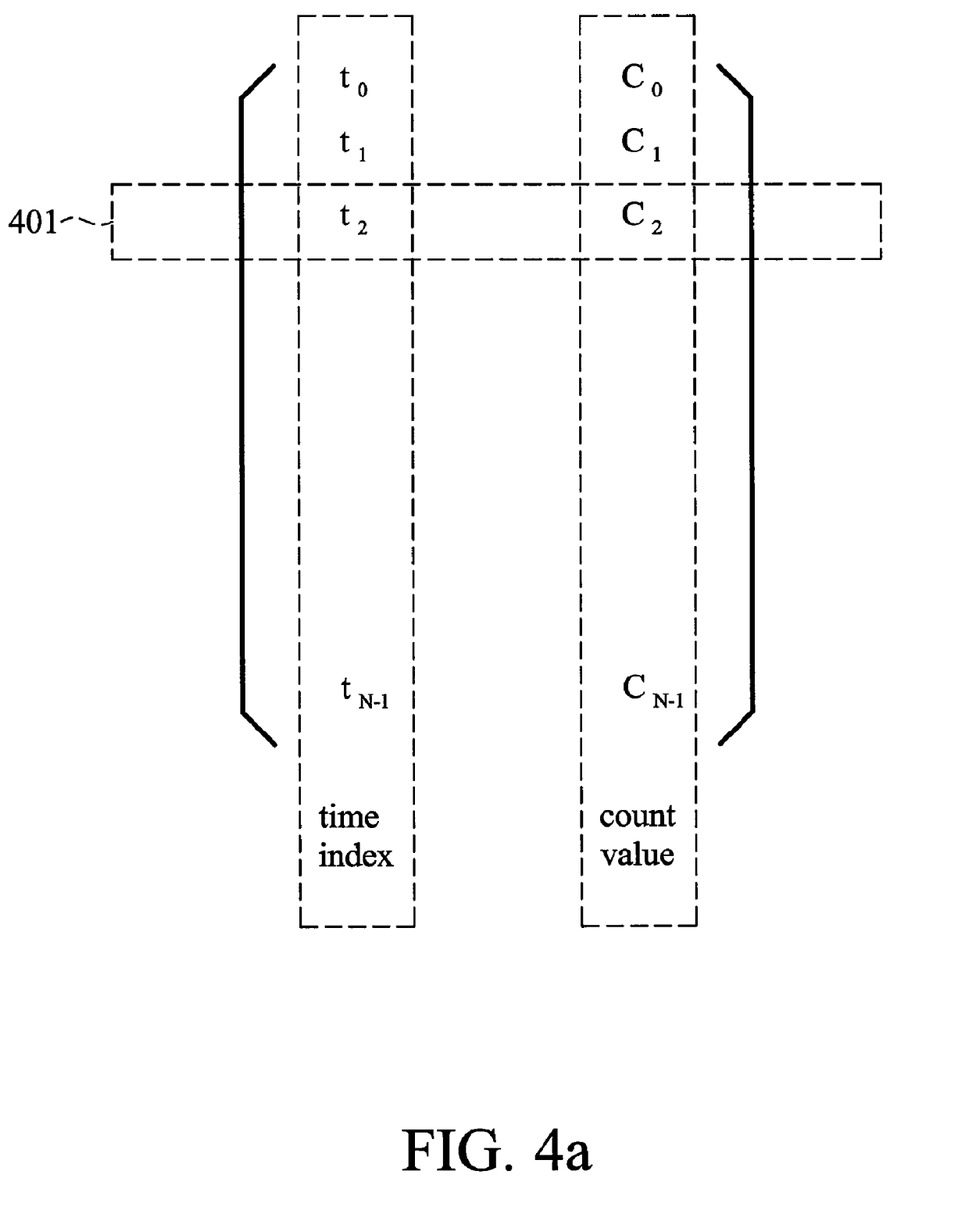
FIG. 4*a* and 4*b* respectively shows a matrix comprise a location index column and a count value column according to an embodiment of the invention.
Figure 4B:
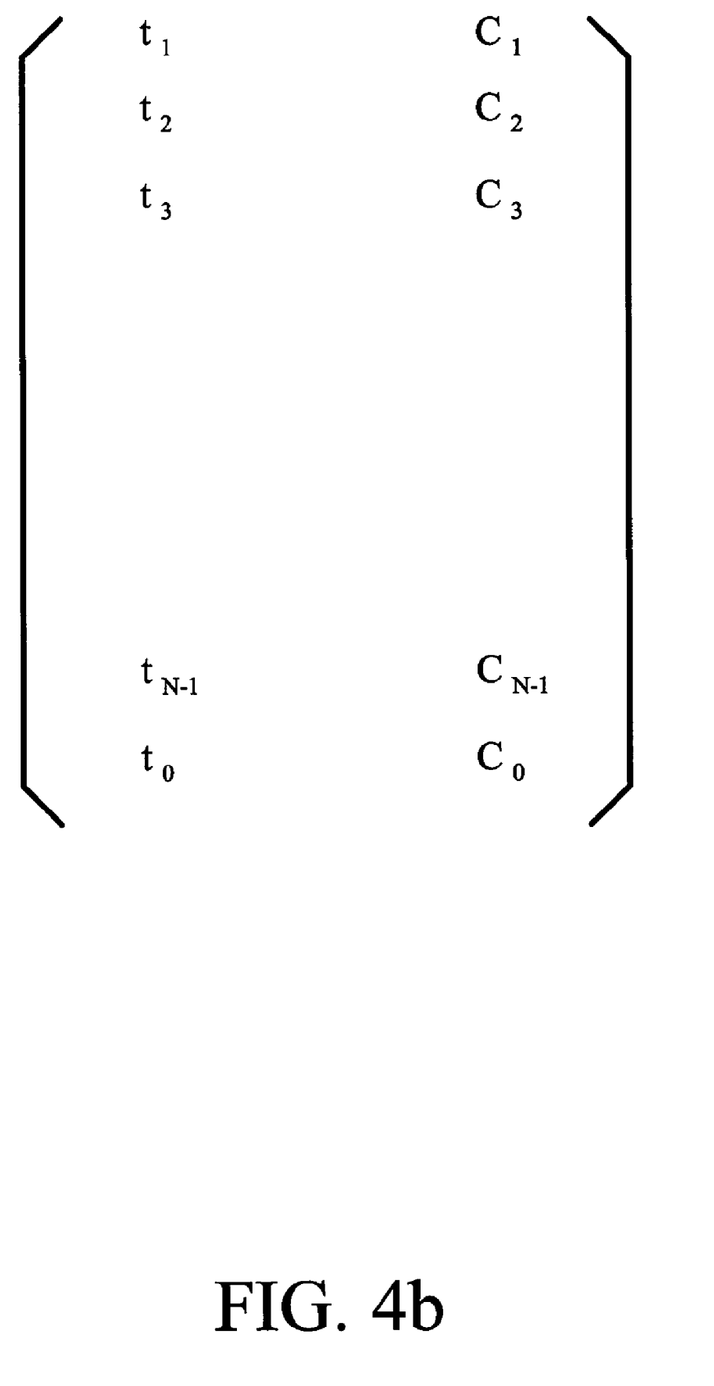

The method of detecting a regularly appearing pattern of period N by comparing the symbol in a symbol stream based on the specific order is illustrated in flowchart 300a. The symbol is at a current location of a symbol stream, which corresponds to a current location index. A row within the matrix is picked as a comparing row for the symbol. The comparing row for a symbol is a row with location index closest to and not prior to the location index corresponding to that symbol, wherein the determination of prior and closest is based on the specific order. In this embodiment, the specific order is an ascending order from 0 to N−1. The flowchart 300a begins at step 301, in which a matrix is provided. The matrix comprises at least one row, and each row has a location index and a count value, as shown in FIG. 4. The count value is associated with the location index for indicating the number of the predetermined value that appears at a location corresponding to the location index. For example, a row 401 with location index $t_2$ and count value $c_2$ means that the regularly appearing pattern appears c1 times at location $q*N+t_2$, where q is a integer number and N is the packet length. In step 302, a symbol is received, the symbol is at the current location of the symbol stream, followed by step 303, the current location is translated to the current location index. The current location index is a remainder of dividing a current location with the packet length. Thus, the location index ranges from 0 to N−1. In step 304, a comparing procedure is proceeded by comparing the received symbol with the predetermined value, in this embodiment, $47_{hex}$. The comparing row within the matrix is picked for the symbol, and the comparing row is the first row of the matrix in this embodiment. If the location index of the comparing row equals the current location index and the received symbol equals the predetermined value, the count value of the comparing row is incremented, as depicted in step 306. Then at step 307a, a preliminary comparing row is picked as a comparing row for the symbol to be compared with the predetermined value in a following proceeding comparing procedure, and the rows of the matrix are re-arranged to make the preliminary comparing row as the first row. In this embodiment, the symbol to be compared in the following proceeding comparing procedure is a next received symbol which will be compared in a next turn proceeding comparing procedure. The re-arrangement is in a circular manner, as shown in FIG. 4b. In this embodiment, if the location index of the first row of the matrix is not later than the current location index, put the first row of the matrix to the last row of the matrix, and the second row becomes the first one, and so on. The received symbol can be determined as a regularly appearing pattern or not according to the count values of the index. If the received symbol equals the predetermined value but the location index of the first row does not equal the current location index, a new row is created, and put at the last row of the matrix in step 309. The location index of the new row is set as the current location index, and the count value of the new row is set to one.

Figure 5A:
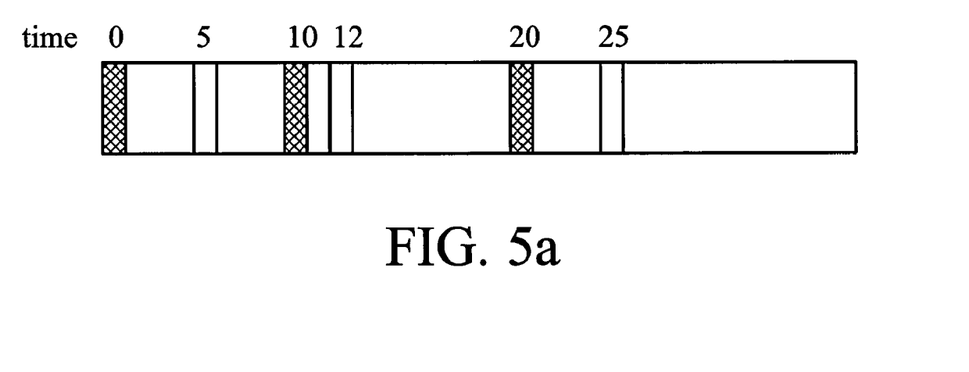
FIG. 5*a* shows an example of stream with regularly and randomly appearing pattern.
Figure 5B:
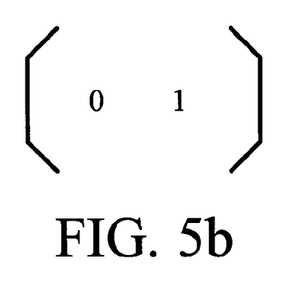
FIG. 5*b*, 5*c*, 5*d*, 5*e*, 5*f* and 5*g* show matrices established at locations 0, 5, 6, 10, 12 and 20 respectively according to an embodiment of the invention.
Figure 5C:
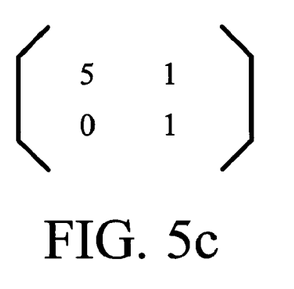
Figure 5D:
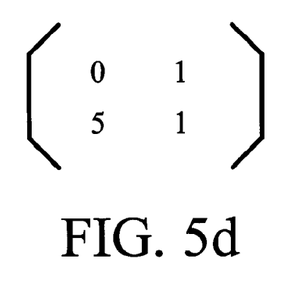
Figure 5E:
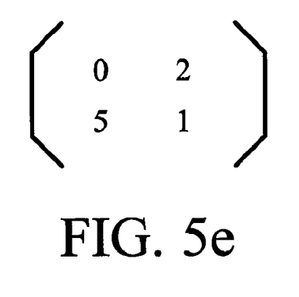
Figure 5F:
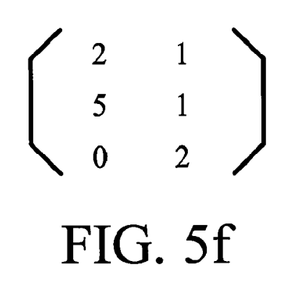
Figure 5G:
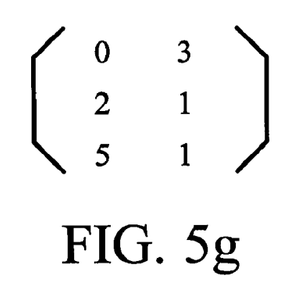

For example, the predetermined value is $47_{hex}$, and the period is 10. The symbol stream has symbols the same as $47_{hex}$ located at 0, 5, 10, 12, and 20, as shown in FIG. 5a. A matrix is null initially, until the first symbol is received at current location 0. After receiving the first symbol, a new row of the matrix is created. The location index of the new row is 0, the count value is 1, as shown in FIG. 5b. At locations 1, 2, 3, and 4, the received symbol does not equal $47_{hex}$, thus, the matrix is not updated. At location 5, the symbol is as same as $47_{hex}$, but the location index of the first row does not equal current location 5, thus, another new row is created, as shown in FIG. 5c. The location index of the new row is noted as 5, and the count value is 1. At location 6, the row with location index 5 is moved to the last row, and the row with location index 0 is the first row, as shown in FIG. 5d. At locations 6, 7, 8, and 9, the matrix is not updated because the received symbol at those locations is not a predetermined value. At current location 10, the current location index is 0. Because the received symbol is the same as the predetermined value, and the location index of the first row equals the current location index, the count value of the first row is incremented, and the first row is then moved to the last row, as shown in FIG. 5e. At location 12, a new row is created as shown in FIG. 5f. The location index of the new row is 2, and the count value is 1. The row is moved to be the last row, the row which location index is 5 becomes the first row. At locations 13-19, the matrix is not updated. At location 20, the count value is incremented to 3, and then moved to the last row as shown in FIG. 5g. So far the highest count value occurs at location index 0, thus, it is reasonable to predict the regularly appearing pattern shows up at location 30, 40, etc. According to the embodiment of the invention, the first row of the matrix is always the comparing row for the symbol to be compared. The order of rows is well-organized so that search time is reduced. Plus, the required memory for storing the matrix is small.

Figure 3B:
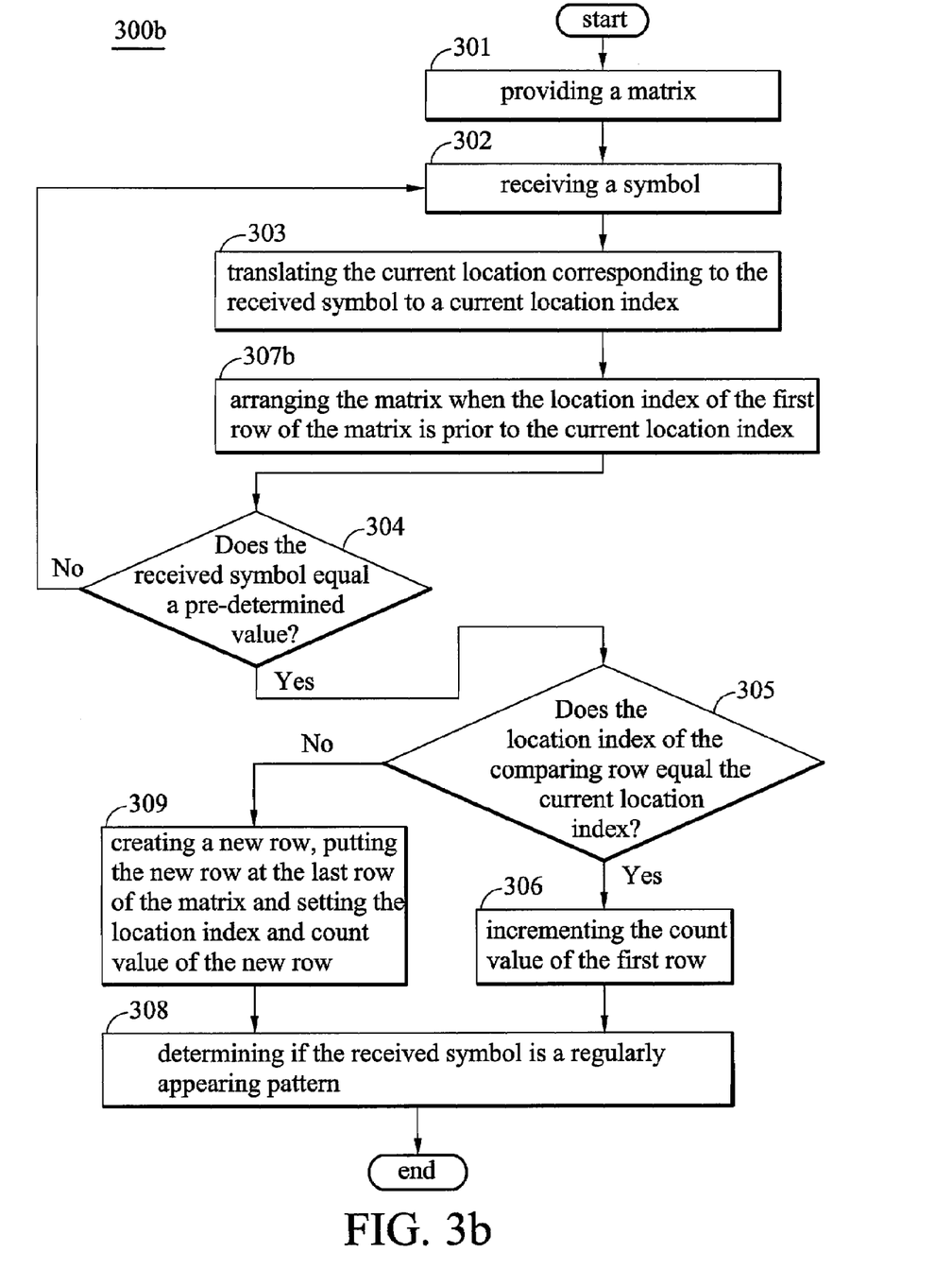

Some steps of 300a can be modified without affecting the result of detecting the regularly appearing pattern. For example, in another embodiment of the invention, the step of arranging the matrix can be performed before picking the comparing row. FIG. 3b shows another flowchart 300b according to embodiment of the invention. In step 307b, the rows of the matrix are re-arranged to make the preliminary comparing row as the first row. In this embodiment, the preliminary comparing row is the comparing row for the received symbol, that is, if the location index of the first row of the matrix is prior to the current location index, put the first row of the matrix to the last row of the matrix, and the second row becomes the first one, and so on.

Figure 6A:
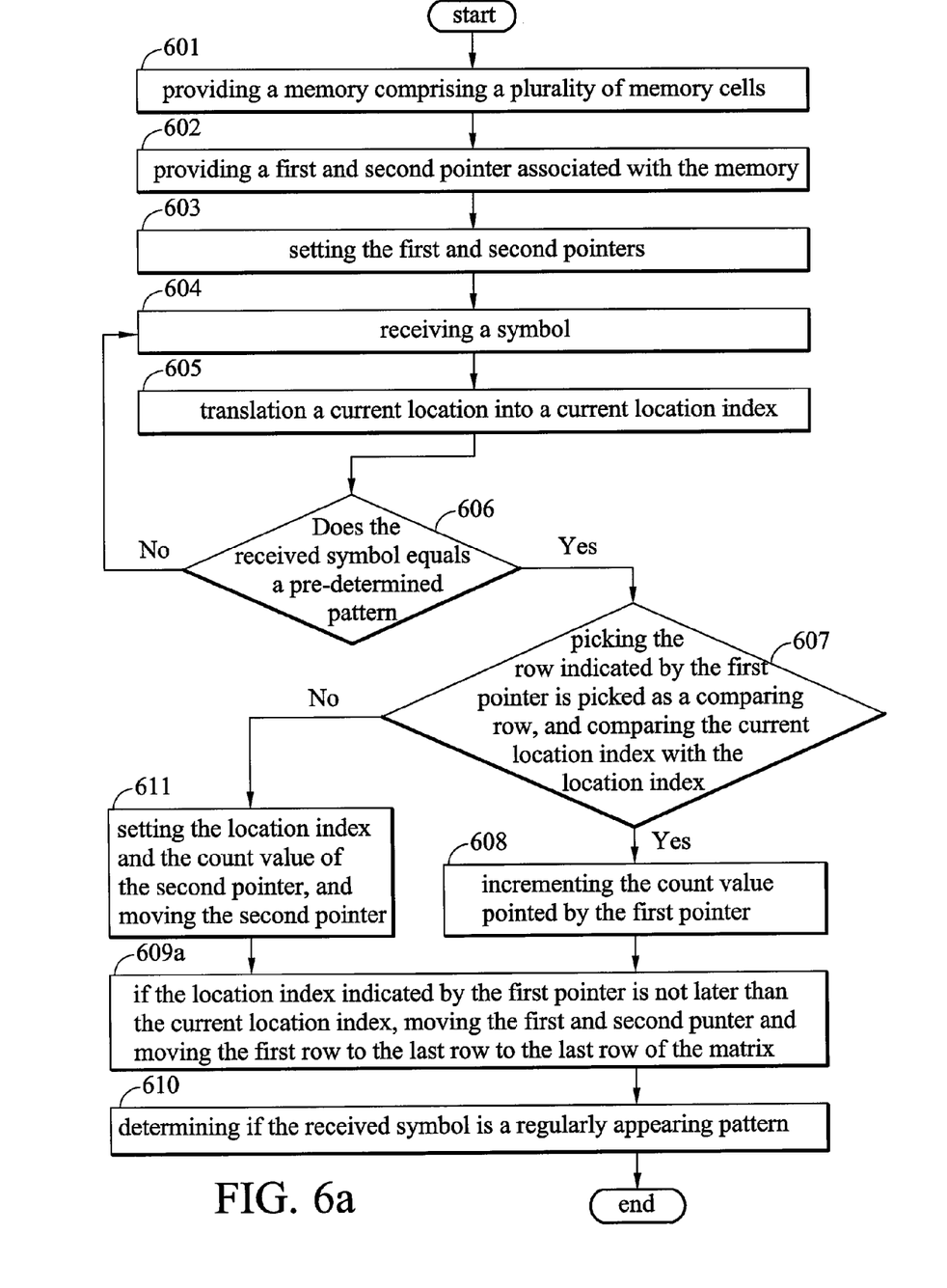
FIG. 6*a* shows a flowchart of detecting regularly appearing patterns.

The invention also provides another embodiment for detecting a regularly appearing pattern in a stream of symbols. In this embodiment, the row of the matrix corresponds to a memory cell of a memory. A first pointer and a second pointer associated with the memory are provided, the first pointer indicates the first row which is also the comparing row for the symbol to be compared, and the second pointer indicates the end row of the matrix. Pointers pass through the end of the memory will next turn around to the start of the memory, and act the memory as a circular buffer. FIG. 6a shows a flowchart of a proposed method for detecting a regularly appearing pattern. Step 601 is accomplished by providing a memory comprising at least one memory cell. Preferably, the memory is a circular buffer. Each memory cell has two fields, one for a location index, and the other for a count value. In step 602, a first and a second pointer associated with the memory cell is provided. At step 603, the memory cell indicated by the first pointer is set to be the same as the memory cell indicated by the second pointer, and the memory cell indicated to by the first and second pointer is set to NULL. In step 604, a symbol is received. A current location index is then translated to represent a current location of the received symbol in the symbol stream in step 605. The current location index is the reminder of dividing the current location index with the period of the regularly appearing pattern. In step 606, a comparing procedure is proceeded by comparing the received symbol with a predetermined value. In step 607, the row indicated by the first pointer is picked as a comparing row, the current location index is compared with the location index indicated of the comparing row. In step 608, if the location index equals the location index indicated by the first pointer and the received symbol is as same as the predetermined value, the count value indicated by the first pointer is incremented. In step 609a, picks the preliminary comparing row as a comparing row for the symbol to be compared with the predetermined value in a following proceeding comparing procedure, which is the comparing row for the next received symbol, and puts the preliminary comparing row as a first row of the matrix, and moves the first pointer to indicate the first row, and moves the second pointer to indicate the end row of the matrix. In this embodiment, if the location index indicated by the first pointer is not later than the current location index put the first row to the last row of the matrix, and moves the first pointer to indicate a memory cell next to the memory cell currently indicated by the first pointer, and moves the second pointer to indicate a memory cell next to the memory cell currently indicated by the second pointer. It is then determined whether the received symbol is a regularly appearing pattern or not according to the count values of the memory in step 610. If the received symbol equals the predetermined value but the location index indicated by the first pointer does not equal the current location index, a new row is created at the memory cell indicated by the second pointer, the location index of the new row is set to be the current location index and the count value of the new row is set to one in step 611. The second pointer is then moved to the memory cell next to the memory cell indicated to by the second pointer.

Figure 6B:
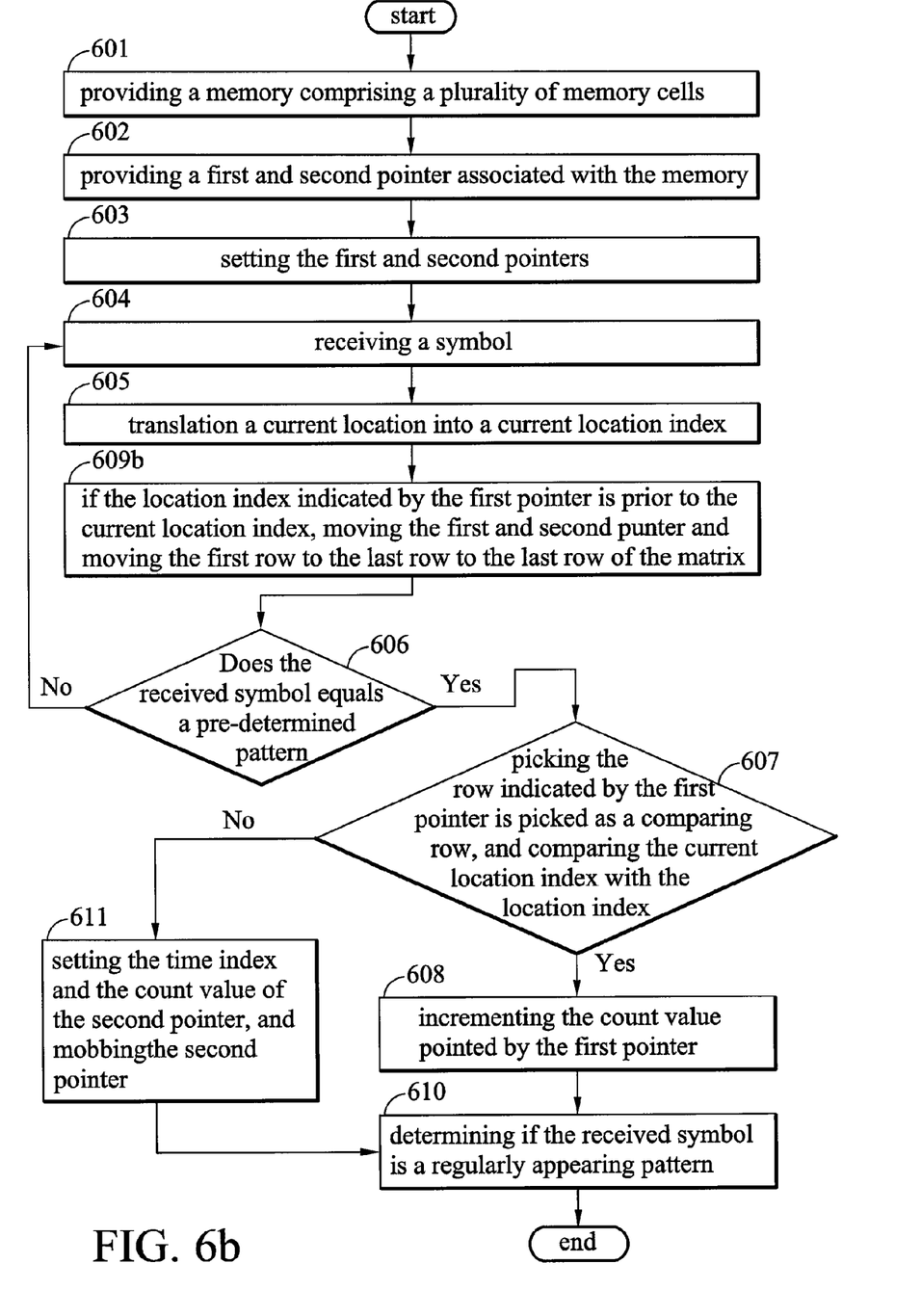
FIG. 6*b* shows another flowchart of detecting regularly appearing patterns.
Figure 7:
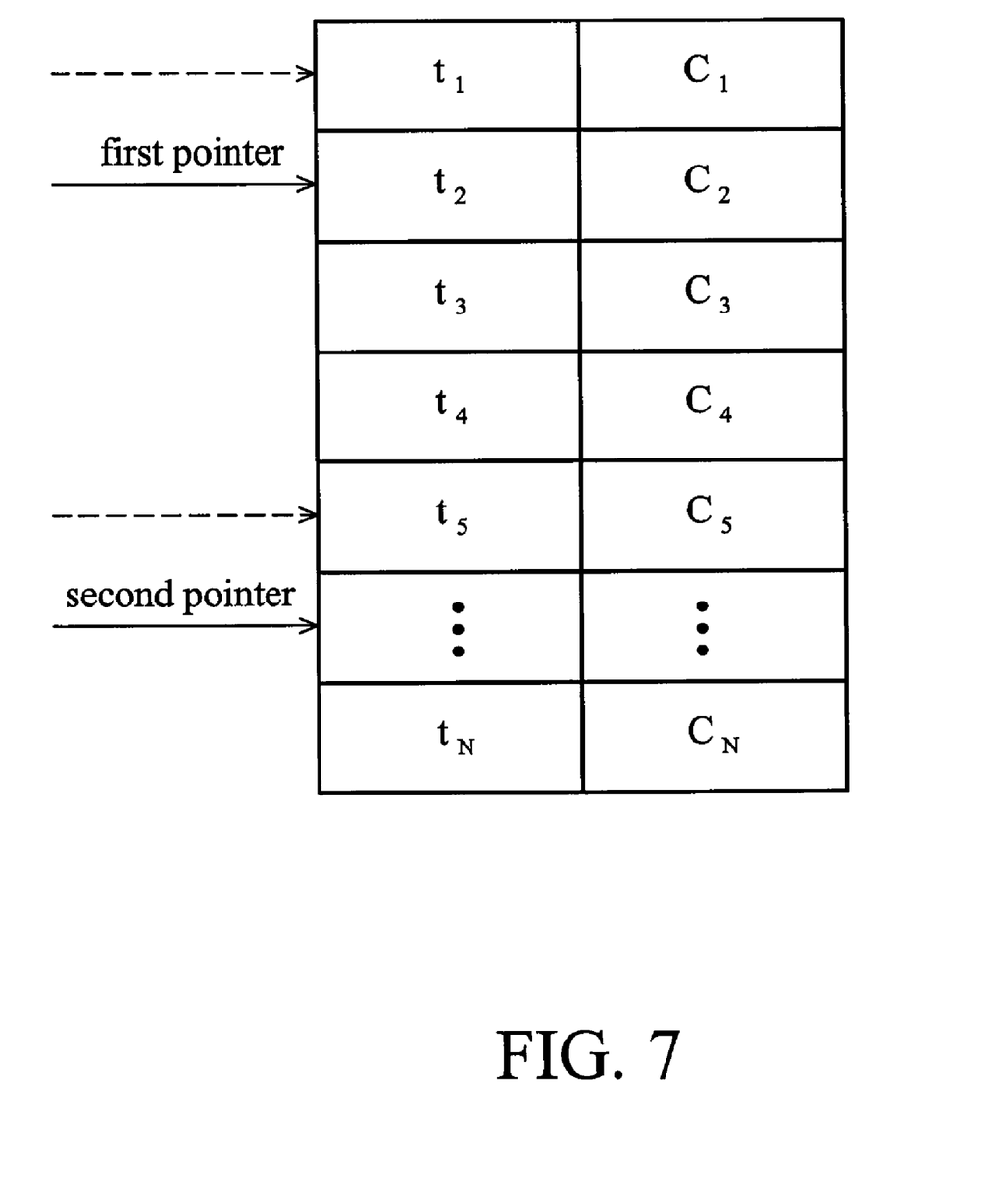
FIG. 7 shows an example of moving the pointers according to an embodiment of inventions.

Some steps in FIG. 6a can be modified without affecting the result of detecting the regularly appearing pattern. For example, in another embodiment of the invention, the step of moving the first and second pointers can be performed following the step 605. FIG. 6b shows another flowchart according to embodiment of the invention, step 609b is performed before step 607. In step 609b, moves the first pointer and the second pointer that if the location index indicated by the first pointer is prior to the current location index, moves the first pointer to indicate a memory cell next to the memory cell currently indicated by the first pointer, as shown in FIG. 7, and moves the second pointer to indicate a memory cell next to the memory cell currently indicated to by the second pointer.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for detecting a regularly appearing pattern by comparing a symbol in a stream of symbols, wherein the regularly appearing pattern is a predetermined pattern, and a period of the regularly appearing pattern is N symbols and each symbol corresponds to a location index ranging from 0 to N−1, and a comparing of each symbol in a stream of symbols is in the order of location index from 0 to N−1, the method is executed by a computer and comprises:

providing a matrix comprising at least one row, wherein each row comprises the location index and a count value, wherein the count value is associated with the location index for indicating the number of a predetermined value that appears at a time corresponding to the location index;

receiving a symbol that corresponds to a current location;

translating the current location into a current location index representing thereof;

picking the first row of the matrix as a comparing row;

proceeding a comparing procedure by comparing the received symbol with the predetermined value;

comparing the current location index with the location index of the comparing row;

incrementing the count value of the comparing row when the current location index equals the location index of the comparing row and the received symbol equals the predetermined value;

arranging the matrix in a circular manner to put a preliminary comparing row as the first row of the matrix, wherein the preliminary comparing row is the comparing row for a symbol to be compared with the predetermined value in the following proceeding comparing procedure;

determining whether the received symbol is the regularly appearing pattern according to the count values in the matrix.

2. The method as claimed in claim 1, wherein the step of arranging the matrix is performed before picking the comparing row, and further comprises moving the first row to be the last row of the matrix when the location index of the first row equals the current location index minus one.

3. The method as claimed in claim 1, wherein the step of arranging the matrix is performed after the step of proceeding the comparing procedure, and further comprises moving the first row to the last row of the matrix when the location index of the first row equals the current location index.

4. The method as claimed in claim 1, further comprising:

creating a new row when the location index of the first row at the matrix does not equal the current location index but the received symbol equals the predetermined value;

setting the location index of the new row to be the same as the current location index and setting the count value of the new row to one; and inserting the new row to the last row of the matrix.

5. The method as claimed in claim 1, wherein the regularly appearing pattern is detected according to the count value of the comparing row.

6. The method as claimed in claim 5, wherein the received symbol is determined as the regularly appearing pattern when the current location index equals the location index of the comparing row and the count value of the comparing row exceeds a threshold.

7. A method for detecting a regularly appearing pattern by comparing a symbol in a stream of symbols, wherein the regularly appearing pattern is a predetermined pattern, and a period of the regularly appearing pattern is N symbols and each symbol corresponds to a location index ranging from 0 to N−1, and a comparing of each symbol in a stream of symbols is in an order of location index from 0 to N−1,the method is executed by a computer and comprises:

providing a memory matrix comprising at least one memory cell, wherein each memory cell has two fields, one field indicating a location index, and the other indicating a count value;

receiving a that symbol corresponds to a current location;

translating a current location index representing the current location;

proceeding a comparing procedure by comparing the received symbol with the predetermined value;

comparing the current location index with the location index of the comparing memory cell;

incrementing the count value of the comparing memory cell when the current location index equals the location index of the comparing row and the received symbol equals the predetermined value;

putting a preliminary comparing memory cell as the first memory cell of the memory matrix, wherein the preliminary comparing memory cell is a comparing memory cell for the symbol to be compared with the predetermined value in the following proceeding comparing procedure;

determining whether the received symbol is the regularly appearing pattern according to the count values of the memory;

providing a first pointer and a second pointer associated with the memory;

picking the memory cell indicated by the first pointer as a comparing memory cell;

arranging the memory matrix and the first and second pointers;

moving the first pointer to indicate the first memory cell of the memory matrix;

moving the second pointer to indicate the end memory cell of the memory matrix.

8. The method as claimed in claim 7, wherein the step of arranging the matrix is performed before the step of picking the comparing memory cell, and further comprises when the location index of the first memory cell equals the current location index minus one, moving the first memory cell to the last memory cell of the memory matrix, and moving the first pointer to a following memory cell next to the memory cell currently indicated by the first pointer.

9. The method as claimed in claim 7, wherein the step of arranging the matrix is performed after the step of proceeding the comparing procedure, and further comprises when the location index of the first memory cell equals the current location index, moving the first memory cell to the last row of the matrix, and moving the first pointer to a following memory cell next to the memory cell currently indicated by the first pointer.

10. The method as claimed in claim 7, further comprising:
setting the location index indicated by the second pointer as same as the current location index and setting the count value indicated by the second pointed to one when the location index of the comparing memory cell does not equal the current location index but the received symbol equals the predetermined value; and moving the second pointer to the memory cell next to the memory cell indicated by the second pointer.

11. The method as claimed in claim 7, wherein the regularly appearing pattern is detected according to the count value of the comparing memory cell.

12. The method as claimed in claim 7, wherein the received symbol is determined as the regularly appearing pattern when the current location index equals the location index of the comparing memory cell and the count value of the comparing memory cell exceeds a threshold.

13. The method as claimed in claim 7, further comprising:
initially setting the memory cell indicated by the first and second pointer to be the same; and initially setting the memory cell indicated by the first and second pointer to NULL.

14. The method as claimed in claim 7, wherein the memory and the first pointer and the second pointer operated as a circular buffer.

15. A method for detecting a regularly appearing pattern by comparing a symbol in a stream of symbols based on a specific order, wherein the pattern is of a predetermined value, and the period of the plurality of regularly appearing pattern is N symbols, the method comprising:

providing a matrix comprising at least one row, wherein each row comprises a location index and a count value, wherein the count value is associated with the location index for indicating the number of the predetermined value that appears at a location corresponding to the location index;

receiving a symbol, wherein the symbol is at a current location of the symbol stream;

translating the current location to a current location index representing the current location, wherein the current location index ranges from 0 to N−1;

picking a comparing row for the symbol, the comparing row is a row of the matrix with the location index closest to and not prior to the location index corresponding to the symbol to be compared with the predetermined value in a following proceeding comparing procedure, wherein the closest to and later than is based on the specific order proceeding the comparing procedure by comparing the received symbol with the predetermined value;

comparing the current location index with the location index of the comparing row;

incrementing the count value of the comparing row when the current location index equals the location index of the comparing row and the received symbol equals the predetermined value; and determining whether the received symbol is the regularly appearing pattern according to the count values in the matrix.

16. The method as claimed in claim 15, wherein in step of picking the comparing row further comprises, when there is no row with location index later than the location index corresponding to the symbol to be compared, pick the row with the most prior location index based on the specific order as the comparing row.

17. The method as claimed in claim 15, wherein the step of translating comprises dividing the current location by the period N and taking the reminder as the current location index.

18. The method as claimed in claim 15, wherein the steps further comprises arranging the row of the matrix in the order of the location index and the first row of the matrix is a preliminary comparing row, wherein the order of the location index is based on the specific order.

19. The method as claimed in claim 18, wherein the specific order is an ascending order from 0 to N−1.

20. The method as claimed in claim 19, wherein the regularly appearing pattern is determined according to the count value of the comparing row.

21. The method as claimed in claim 19, wherein the received symbol is determined as the regularly appearing pattern when the current location index equals the location index of the comparing row and the count value of the comparing row exceeds a threshold.

22. The method as claimed in claim 18, wherein the specific order is a descending order from N−1 to 0.

23. The method as claimed in claim 18, wherein the step of arranging the row of the matrix is before the step of picking the comparing row, the step of arranging the rows of the matrix further comprises moving the first row to be the last row of the matrix when the location index of the first row is prior to the current location index in sense of the specific order.

24. The method as claimed in claim 18, wherein the step of arranging the row of the matrix is after the step of proceeding the comparing procedure, the step of arranging the rows of the matrix further comprises moving the first row to be the last row of the matrix when the location index of the first row is not later than the current location index in sense of the specific order.

25. The method as claimed in claim 24, further comprising:
   initially setting the row indicated by the first and second pointer to be the same; and
   initially setting the memory cell corresponding to the row indicated by the first and second pointer to NULL.

26. The method as claimed in claim 24, wherein the memory and the first pointer and the second point are operated as a circular buffer.

27. The method as claimed in claim 18, wherein the regularly appearing pattern is detected according to the count value of the first row.

28. The method as claimed in claim 15, further comprising:
   creating a new row when the location index of the comparing row at the matrix does not equal the current location index but the received symbol equals the predetermined value;
   setting the location index of the new row to be the current location index and setting the count value of the new row to one; and
   inserting the new row to be the last row of the matrix.

29. The method as claimed in claim 15, wherein the received symbol is determined as the regularly appearing pattern when the current location index equals the location index of the comparing row and the count value of the first row exceeds a threshold.

30. The method as claimed in claim 15, wherein the row of the matrix corresponds to a memory cell of a memory, the steps further comprises:
   providing a first pointer and a second pointer associated with the memory;
   moving the first pointer to indicate the first row of the matrix;
   moving the second pointer to indicate the end row of the matrix.

31. The method as claimed in claim 30, wherein the steps further comprises arranging the first row of the matrix as a preliminary comparing row and the rows of the matrix in the order of the location index, wherein the order of the location index is based on the specific order.

32. The method as claimed in claim 31, wherein the step of arranging the row of the matrix is before the step of picking the comparing row, the step of arranging the rows of the matrix further comprises, when the location index of the row indicated by the first pointer prior to the current location index in sense of the specific order:
   moving the first pointer to indicate a row next to the row indicated by the first pointer;
   putting the first row to be the last row of the matrix; and
   moving the second pointer to indicate a row next to the row indicated by the second pointer.

33. The method as claimed in claim 31, wherein the step of arranging the row of the matrix is after the step of comparing the received symbol, the step of arranging the rows of the matrix further comprises, when the location index of the row indicated by the first pointer not later than the current location index in sense of the specific order:
   moving the first pointer to indicate a row next to the row indicated by the first pointer;
   putting the first row to be the last row of the matrix; and
   moving the second pointer to indicate a row next to the row indicated by the second pointer.

34. The method as claimed in claim 31, further comprising:
   creating a new row at location indicated by the second pointer, setting the location index of the new row as the current location index and setting the count value of the new row as one when the location index of the comparing row is not equal the current location index and the received symbol equals the predetermined value; and
   moving the second pointer to the next of the row indicated by the second pointer.

* * * * *